United States Patent
Bedetti

(10) Patent No.: US 9,597,649 B2
(45) Date of Patent: Mar. 21, 2017

(54) FLUID BED GRANULATION PROCESS AND APPARATUS

(75) Inventor: Gianfranco Bedetti, Milan (IT)

(73) Assignee: Casale SA (CH)

(*) Notice: Subject to any disclaimer, the term of this patent is extended or adjusted under 35 U.S.C. 154(b) by 1413 days.

(21) Appl. No.: 10/560,459

(22) PCT Filed: May 19, 2004

(86) PCT No.: PCT/EP2004/005377
§ 371 (c)(1),
(2), (4) Date: Dec. 14, 2005

(87) PCT Pub. No.: WO2005/002718
PCT Pub. Date: Jan. 13, 2005

(65) Prior Publication Data
US 2006/0151646 A1    Jul. 13, 2006

(30) Foreign Application Priority Data
Jun. 26, 2003 (EP) .................................. 03014359

(51) Int. Cl.
*B01J 2/16* (2006.01)
(52) U.S. Cl.
CPC ...................................... *B01J 2/16* (2013.01)
(58) Field of Classification Search
CPC ........................................................ B01J 2/16

USPC ........................................................ 427/213
See application file for complete search history.

(56) References Cited

U.S. PATENT DOCUMENTS

| | | | |
|---|---|---|---|
| 2,635,684 A * | 4/1953 | Joscelyne | 159/48.1 |
| 3,036,338 A | 5/1962 | Nack | |
| 3,836,611 A * | 9/1974 | Mavrovic | 264/14 |
| 3,883,344 A * | 5/1975 | Griffith et al. | 423/45 |
| 4,005,136 A * | 1/1977 | Brichard | C08J 3/12 |
| | | | 264/121 |
| 4,276,062 A * | 6/1981 | Lyon | B01J 8/005 |
| | | | 209/139.2 |
| 4,946,653 A | 8/1990 | Stopp et al. | |
| 5,149,643 A * | 9/1992 | Mothes | C07C 51/42 |
| | | | 435/136 |
| 5,213,820 A | 5/1993 | Uhlemann et al. | |
| 6,290,775 B1 * | 9/2001 | Kohlen et al. | 118/303 |

FOREIGN PATENT DOCUMENTS

| | | |
|---|---|---|
| CA | 2528856 A1 | 1/2005 |
| EP | 1 312 410 A1 | 5/2003 |
| WO | 02/074427 A2 | 9/2002 |
| WO | WO02/074427 * | 9/2002 |

* cited by examiner

Primary Examiner — Robert Vetere
(74) Attorney, Agent, or Firm — Akerman LLP

(57) ABSTRACT

Fluid bed granulation process of an appropriate substance, comprising the cooling in a second fluid bed of the granules obtained. The same flow of fluidification air is used to form and support both fluid beds.

1 Claim, 2 Drawing Sheets

FLUID BED GRANULATION PROCESS AND APPARATUS

FIELD OF APPLICATION

In its most general aspect, the present invention refers to a fluid bed granulation process of an appropriate substance like, for example, urea, ammonium nitrate, ammonium chloride and similar substances susceptible to being granulated.

In particular, this invention concerns a fluid bed granulation process in which the obtained granules are cooled in a second fluid bed and sent from here to storage and/or packaging.

The invention also refers to a granulation apparatus, used to carry out the aforementioned process.

PRIOR ART

In a fluid bed granulation process, the obtainment of a granules of a predetermined substance takes place through continuous growth (in volume and in mass) of seeds of that a substance, continuously fed into said fluid bed, at the same time as a flow of an appropriate growth substance in liquid state. The growth substance is of the same nature as the substance to be granulated and is in liquid form, suitable for wetting, adhering and solidifying on the seeds and on the growing granules which, together, constitute said fluid bed.

Such a growth substance in liquid state is fed to the fluid bed at a predetermined temperature, for example 120-140° C. in the case of urea, so that the growth substance itself, once solidified on the seeds, can keep adherence characteristics such as to allow adhesion to the granule of further growth substance while it is inside the fluid bed.

For that reason, the outer surface of the granules coming out from the fluid bed has a temperature close to that of the growth substance fed to the fluid bed.

When the substance to be granulated is, for example, urea, the temperature of the finished granules coming out from the fluid bed is, for example, about 110-120° C.

The granulated product must, for its subsequent use, for example as fertilizer, be cooled down to a temperature suitable for storage in a warehouse. For urea granules, that temperature is for example about 50° C.

To satisfy the aforementioned requirement, fluid bed granulation processes have been proposed in which a cooling of the granules produced is provided.

In particular, a fluid bed granulation process (U.S. Pat. No. 4,219,589) has been proposed in which the high-temperature granules produced are cooled in a second fluid bed.

Although advantageous from different points of view, the fluid bed granulation process of the aforementioned type suffers from a serious recognized drawback.

In such a process, indeed, besides the large amounts of air to be fed for the formation and maintenance of the granulation fluid bed, it is necessary to continuously feed further large amounts of air for the formation and maintenance of the cooling fluid bed; consequently, greater energy consumption is required which has a negative impact upon the cost-effectiveness of the process.

SUMMARY OF THE INVENTION

The problem underlying the present invention is to devise and to make available a fluid bed granulation process having functional characteristics so as to overcome all the cited drawbacks linked to the prior art and, in particular, such that the total air consumption required to complete the granulation process is substantially reduced.

This problem is solved according to the invention by a fluid bed granulation process of an appropriate substance, comprising the cooling in a second fluid bed of the obtained granules, characterized in that a same flow of fluidification air is fed to form and support continuously and in the order said cooling and, respectively, granulation fluid beds, substantially arranged in series with respect to said flow.

Further characteristics and advantages of the invention will become clearer from the detailed description of an embodiment of a fluid bed granulation process according to the invention, given hereafter with reference to the attached drawings, for indicative and non-limiting purposes.

DETAILED DESCRIPTION OF A PREFERRED EMBODIMENT

Figure 1:
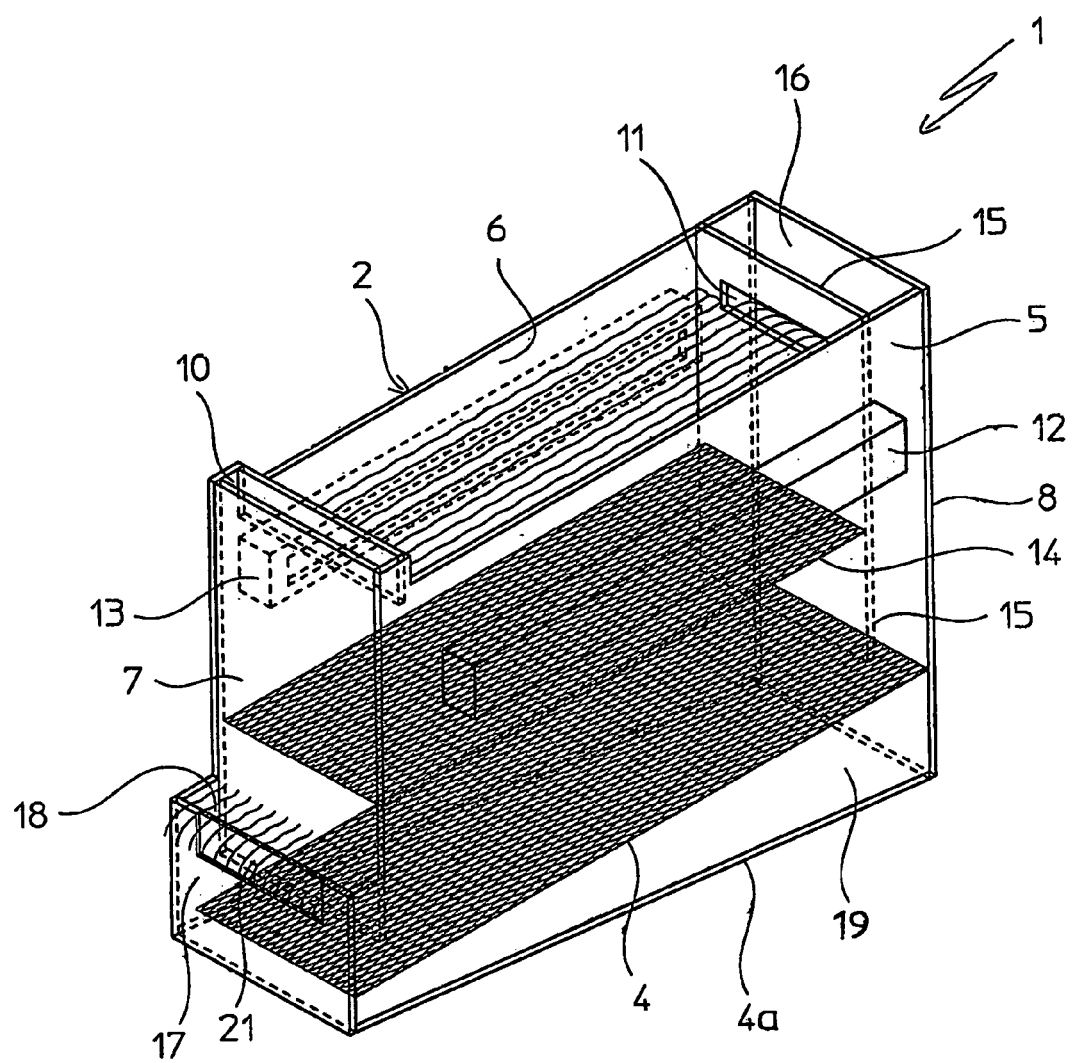
FIG. 1 schematically shows an axonometric view of an apparatus for carrying out the fluid bed granulation method of the present invention.

With reference to the figures, an apparatus for carrying out a fluid bed granulation process according to the present invention is globally indicated with 1.

Such an apparatus comprises a self-supporting structure 2, substantially in the shape of a parallelepiped container, which defines a space A inside it, in which two fluid beds F1 and F2 are intended to be realized, as can be seen more clearly in the rest of the description.

Said container structure 2 (which hereafter shall simply be called: container 2), has long side walls 5, 6, short front 7 (or top) and rear 8 walls; it is closed at the top by a conventional and therefore unrepresented cover, and it is equipped at the bottom with a double base plate, 4, 4a, upper and lower respectively.

In accordance with a characteristic of the present invention, the top wall 7, of said container 2, has the bottom side 7a, spaced from the base plate 4, of said double base plate, with which it thus defines a passage (or port) 20, which places the space A in communication with the outside of said container 2. Moreover, in accordance with another characteristic of the present invention, the aforementioned base plates 4, 4a, extend from the rear wall 8, of the container 2, up to past said top wall 7, for a predetermined length portion. At their free front ends, to a front panel 17 is fixed to the base plates 4, 4a, preferably substantially parallel to the top wall 7, with which it constitutes a sort of pocket 18, in the example of the figures extending for the whole width of said wall 7 and in communication with the space A, through the aforementioned passage 20.

The base plates 4, 4a of said double base plate, the rear wall 8 of the container 2 and the front panel 17 define a chamber 19 that is in fluid communication with the space A right through said base plate 4, provided perforated, grated or in any case permeable to gas flows. Said chamber 19, extending below the space A, is of limited height and is intended to constitute a chamber for uniform distribution of a flow of fluidification air coming into said space A, as will better turn out from the following of the description.

Advantageously, and in accordance with a further characteristic of the present invention, said distribution chamber 19 has a tapered profile starting from the rear wall 8 of the container 2, towards the front panel 17. For such a purpose, the base plate 4a is provided tilted on the opposite base plate 4, and converging on it towards the aforementioned front panel 17.

Inside said container 2 a rectangular vertical panel 15 is supported, parallel and in a predetermined spaced relationship from the rear wall 8 of said container 2, with which it defines an interspace 16.

Said panel 15, is fixed to the opposite long walls 5 and 6 of said container 2, whereas it has the horizontal bottom side 15a spaced from the base plate 4, so as to define with it a passage (or port) 25, suitable for placing said interspace 16 in communication with the space A inside the container itself. The interspace 16 is in communication with the space A, also close to an upper part of the panel 15, through an opening 11.

Inside the container 2 and at a predetermined distance from its base plate 4, a rectangular shelf 14 is positioned, perimetrically fixed to the long sides 5, 6, to the front wall 7, of said container 2 and to the aforementioned panel 15. Said shelf 14, defines in said space A, a granulation zone B and is intended support the granulation bed F1 of a predetermined substance; for such a purpose the shelf 14 is perforated, grated or in any case made permeable to a flow of fluidification air, necessary for the formation and maintenance of said bed F1.

In FIG. 1, a distributor device (per se known) of seeds of granules of the substance to be granulated, positioned in the container 2, at its top, is schematized with 10, whereas distributor-supplier devices of granule growth liquid substance (also known and therefore not represented in detail) are schematized with 12 and 13.

Figure 2:
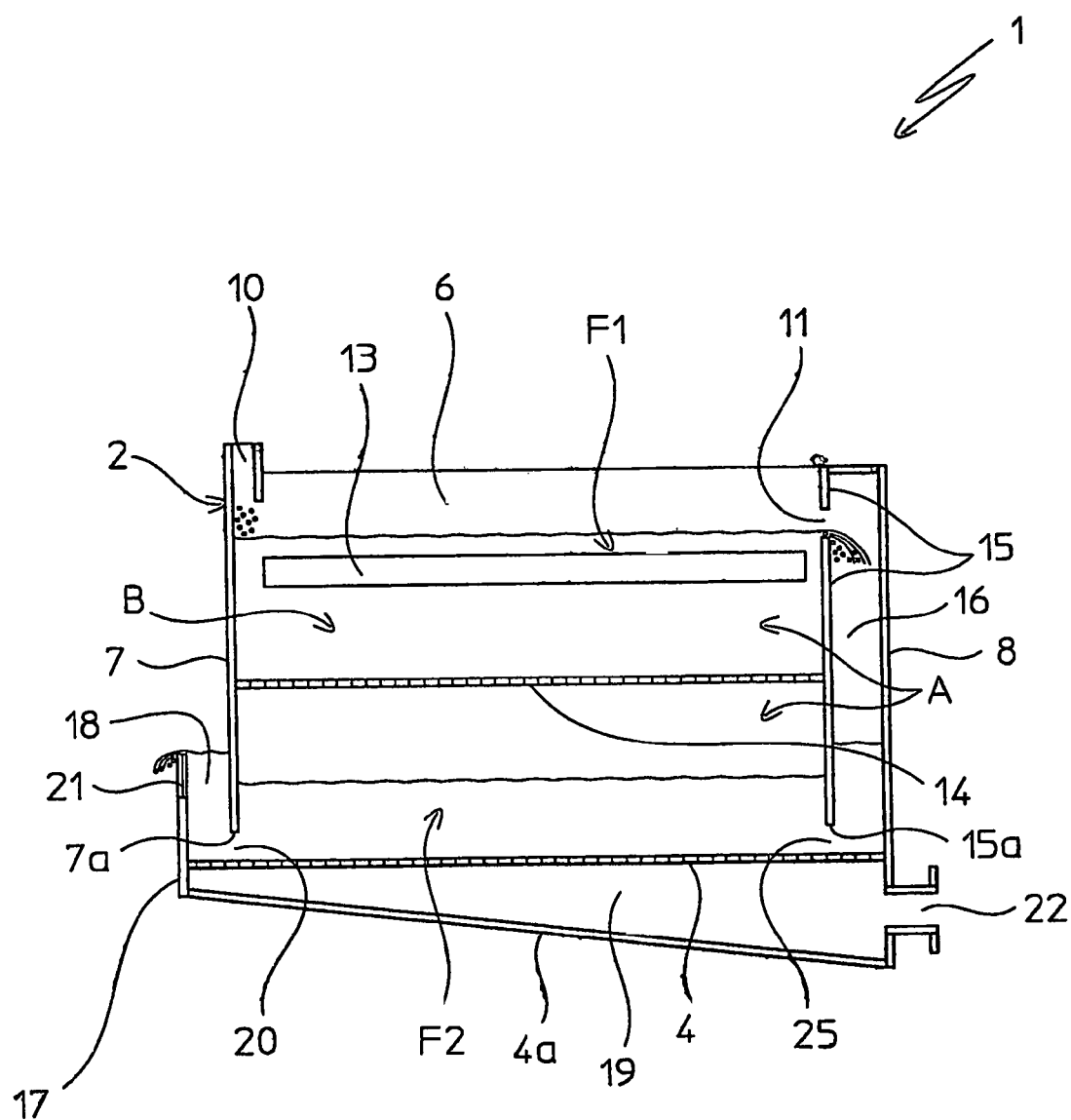
FIG. 2 schematically shows a section view of the apparatus of FIG. 1.

In FIG. 2, an opening is schematized with 22, associated with the rear wall 8, for the entry of air inside the chamber 19. Such an opening 22 is in fluid communication with per se known, and therefore not represented, means to blow the air into said chamber 19.

With reference to the apparatus of FIGS. 1 and 2, an embodiment of the granulation process of the present invention shall now be described.

By feeding a continuous flow of seeds of granules of a predetermined and at the same time a continuous flow of growth substance into the granulation zone B, a granulation fluid bed F1 is formed on the shelf 14. This granulation bed is obtained, supported and maintained through a continuous flow of fluidification air, fed into the chamber 19 and from here, through the base plate 4, into the space A, below said shelf 14. Corresponding to the proceeding of the granulation (growth of granules) there is an increase in the height of the fluid bed F1, until its free surface reaches the (precalculated) level of the opening 11. At this point, through said opening 11, which substantially acts as a weir, begins a continuous pouring (or "discharge") from the bed F1 to the interspace 16, of granules of substance which are very hot (their temperature depends upon the temperature of the growth substance) and above all which are finished, in other words of predetermined grain size.

From the start of such pouring onwards the height of the granulation bed F1 remains substantially constant.

The finished granules, continuously passed in the interspace 16, "fall" in a substantially guided manner, or in a cascade, on a fluid bed F2 comprising finished granules 15 arranged for the starting step adjacent to the perforated base plate 4, where they are subjected to the aforementioned flow of fluidification air used for the bed F1. On such a base plate 4 a second fluid bed F2 is thus defined, consisting exclusively of finished granules, which extends in said space A, on said base plate 4, in the interspace 16 and in the pocket 18, which communicate with said space.

On the free surface of the fluid bed F2 at the interspace 16 and the pocket 18 there is a lower pressure with respect to what can be measured on the free surface of the fluid bed F2 at the chamber A, between the walls 7 and 15; for this reason, and since the three quoted zones are functionally comparable to communicating vessels, the height of the fluid bed F2 in the interspace 16 and in the pocket 18 is greater with respect to that between the walls 7 and 15, on said base plate 4.

It should be noted that the cooling fluid bed F2 is in fluid communication with the overlying granulation bed F1 exclusively through the shelf 14, for supporting said bed.

It should also be noted that the aforementioned interspace 16 carries out a duct function, so-called downcomer, for the transfer of the granules from bed F1 to bed F2.

In the fluid bed F2, the finished granules exchange heat with the quoted flow of fluidification air, being cooled by it. For such a reason, the zone of space A between said base plate 4 and the overlying shelf 14, is known as the granule cooling zone.

The height of the fluid bed F2 (cooling bed) is such that its free surface in the pocket 18 reaches the upper edge of the front panel 17, ensuring the discharge, to outside of the container 2, of finished and cooled granules.

Since the fluid bed, as is well known, has behavior totally comparable to that of a liquid, the levels of the granules in the pocket 18, in the interspace 16 and in the space A are stabilized at the respective piezometric heights.

It should therefore be noted that the height of said front panel 17, by determining the height of the fluid bed F2, also determines the average permanency time of the finished granules in the cooling zone and, consequently, the temperature of the finished granules discharged from the granulation container 2 of the present invention.

From the start of the aforementioned "discharge" of finished granules, the process of the present invention and the relative apparatus are operating.

At this point a basic characteristic of the process of the present invention should be noted the beds F1 and F2, respectively for granulation and cooling of the finished granules, are formed and supported by a same flow of fluidification air, with respect to which said beds F1 and F2 are arranged substantially in series.

A second characteristic of the aforementioned process is that the finished and hot granules are poured substantially in cascade from said granulation bed to the cooling bed.

The main advantage achieved by the present invention consists of the saving in air consumption with respect to what has been required up to now to carry out fluid bed granulation processes of the prior art. Taking into account the substantial amounts of fluidification air involved in the aforementioned processes, such a saving translates into an equally substantial energy saving.

According to an advantageous and preferred embodiment, a part of said front panel 17 consists of a mobile bulkhead 21, adjustable in height (able to slide vertically). In this way it is possible to dynamically control the height of the cooling fluid bed F2, so as to provide air at an optimal temperature (for example constant through summer and winter) to the fluid bed F1, whatever are the temperature conditions of the fluidification air fed into said space A, and allowing in this way to avoid using inefficient heat exchangers.

The invention thus conceived is susceptible to further variants and modifications all of which fall within the inventive concept and, as such, fall within the scope of protection of the invention itself, as defined by the following claims.

For example, the pocket 18 and the interspace 16 can be realized with a width lower than the width of the corresponding short front wall 7, of the panel 15 respectively.

The invention claimed is:

1. A fluid bed granulation process of a predetermined substance, comprising:

forming granules in a parallelepiped granulation fluid bed through continuous growth of solid seeds of said predetermined substance, continuously fed into the granulation fluid bed at the same time as a flow of an appropriate growth substance in a liquid state; and discharging the formed finished granules from said granulation fluid bed and feeding said granules in a space of a second, cooling fluid bed;

cooling the formed finished granules in said second, cooling fluid bed;

wherein a same flow of fluidification air is used to form and continuously support the granules, the flow of fluidification air being arranged to flow in order first through said cooling fluid bed and then through said parallelepiped granulation fluid bed, which are substantially arranged in series with respect to said flow; and discharging the formed finished and cooled granules from said second parallelepiped cooling fluid bed to the outside through a pocket in said second fluid bed, in fluid communication with said space of a second parallelepiped cooling fluid bed, said pocket being flown by said same flow of fluidification air; and wherein the finished granules of said substance are transferred substantially in cascade from said granulation bed to said cooling bed through an interspace defined outside said granulation bed.

* * * * *